United States Patent
Suit et al.

(10) Patent No.: US 8,429,748 B2
(45) Date of Patent: Apr. 23, 2013

(54) NETWORK TRAFFIC ANALYSIS USING A DYNAMICALLY UPDATING ONTOLOGICAL NETWORK DESCRIPTION

(75) Inventors: John M. Suit, Mount Airy, MD (US); Nathaniel R. Tabernero, Baltimore, MD (US); Daniel L. Becker, Frederick, MD (US); Adam J. Keeton, Clarksville, MD (US); Joshua Suereth, Odenton, MS (US)

(73) Assignee: Red Hat, Inc., Raleigh, NC (US)

( * ) Notice: Subject to any disclaimer, the term of this patent is extended or adjusted under 35 U.S.C. 154(b) by 319 days.

(21) Appl. No.: 12/626,872

(22) Filed: Nov. 27, 2009

(65) Prior Publication Data

US 2010/0077078 A1 Mar. 25, 2010

Related U.S. Application Data

(63) Continuation-in-part of application No. 11/767,173, filed on Jun. 22, 2007.

(51) Int. Cl.
*G06F 21/00* (2006.01)

(52) U.S. Cl.
USPC .............. 726/23; 726/13; 726/26; 380/255; 713/161; 713/166; 709/224; 709/225; 455/456.1; 705/14.45

(58) Field of Classification Search .............. 726/22–23; 709/224
See application file for complete search history.

(56) References Cited

U.S. PATENT DOCUMENTS

| | | | |
|---|---|---|---|
| 7,181,769 B1 | 2/2007 | Keanini et al. | |
| 7,356,679 B1 | 4/2008 | Le et al. | |
| 7,600,259 B2 * | 10/2009 | Qi | 726/25 |
| 7,698,545 B1 | 4/2010 | Campbell et al. | |
| 7,761,917 B1 | 7/2010 | Kumar | |
| 7,774,498 B1 | 8/2010 | Kraemer et al. | |
| 7,877,781 B2 | 1/2011 | Lim | |
| 7,886,294 B2 | 2/2011 | Dostert et al. | |
| 7,949,404 B2 | 5/2011 | Hill | |
| 7,987,359 B2 * | 7/2011 | Kawano et al. | 713/161 |
| 7,996,836 B1 | 8/2011 | McCorkendale et al. | |
| 8,127,290 B2 | 2/2012 | Suit | |

(Continued)

FOREIGN PATENT DOCUMENTS

| | | |
|---|---|---|
| WO | WO 2005-050414 | 6/2005 |
| WO | WO 2005-101782 | 10/2005 |

OTHER PUBLICATIONS

Chen et al., "Design and Implementation of a Large-Scale Context Fusion Network", Proceedings of the First Annual International Conference on Mobile and Ubiquitous Systems: Networking and Services (MobiQuitous'04).*
Red Hat Office Action for U.S. Appl. No. 11/767,173, mailed Jul. 6, 2010.

(Continued)

*Primary Examiner* — Morshed Mehedi
(74) *Attorney, Agent, or Firm* — Lowenstein Sandler LLP

(57) ABSTRACT

Network traffic analysis is performed by deploying, across a network having a plurality of network nodes, at least one data collection agent, on at least two of the plurality of network nodes. Each data collection agent may monitor at each network node, a plurality of network connections instantiated during a monitoring time period. Data resulting from the monitoring is acquired from the data collection agents and an ontological description of the network is automatically created from the acquired data. The ontological description is dynamically updated and network traffic analysis is performed using the dynamically updating ontological description.

20 Claims, 5 Drawing Sheets

U.S. PATENT DOCUMENTS

| | | | |
|---|---|---|---|
| 8,191,141 B2 | 5/2012 | Suit | |
| 8,336,108 B2 | 12/2012 | Suit | |
| 2003/0014626 A1 | 1/2003 | Poeluev et al. | |
| 2003/0046586 A1 | 3/2003 | Bheemarasetti et al. | |
| 2003/0084329 A1 | 5/2003 | Tarquini | |
| 2003/0101245 A1 | 5/2003 | Srinivasan et al. | |
| 2003/0120935 A1 | 6/2003 | Teal et al. | |
| 2003/0145225 A1* | 7/2003 | Bruton et al. | 713/201 |
| 2003/0158983 A1 | 8/2003 | Dalakuras et al. | |
| 2004/0122937 A1* | 6/2004 | Huang et al. | 709/224 |
| 2005/0010765 A1 | 1/2005 | Swander et al. | |
| 2005/0102529 A1 | 5/2005 | Buddhikot et al. | |
| 2005/0125503 A1 | 6/2005 | Iyengar et al. | |
| 2005/0125520 A1* | 6/2005 | Hanson et al. | 709/223 |
| 2005/0240558 A1 | 10/2005 | Gil et al. | |
| 2005/0289648 A1 | 12/2005 | Grobman et al. | |
| 2006/0023638 A1* | 2/2006 | Monaco et al. | 370/252 |
| 2006/0037072 A1* | 2/2006 | Rao et al. | 726/14 |
| 2006/0041885 A1 | 2/2006 | Broquere et al. | |
| 2006/0123133 A1 | 6/2006 | Hrastar | |
| 2006/0136720 A1 | 6/2006 | Armstrong et al. | |
| 2006/0156380 A1 | 7/2006 | Gladstone et al. | |
| 2006/0230134 A1* | 10/2006 | Qian et al. | 709/224 |
| 2006/0271395 A1 | 11/2006 | Harris et al. | |
| 2007/0011667 A1 | 1/2007 | Subbiah et al. | |
| 2007/0043860 A1 | 2/2007 | Pabari | |
| 2007/0058551 A1 | 3/2007 | Brusotti et al. | |
| 2007/0147271 A1* | 6/2007 | Nandy et al. | 370/254 |
| 2007/0169121 A1 | 7/2007 | Hunt et al. | |
| 2007/0198656 A1 | 8/2007 | Mazzaferri et al. | |
| 2007/0204153 A1 | 8/2007 | Tome et al. | |
| 2007/0234412 A1 | 10/2007 | Smith et al. | |
| 2007/0234425 A1* | 10/2007 | Kim et al. | 726/23 |
| 2007/0238524 A1 | 10/2007 | Harris et al. | |
| 2007/0261112 A1 | 11/2007 | Todd et al. | |
| 2008/0005124 A1 | 1/2008 | Jung et al. | |
| 2008/0016115 A1* | 1/2008 | Bahl et al. | 707/104.1 |
| 2008/0016570 A1 | 1/2008 | Capalik et al. | |
| 2008/0047009 A1 | 2/2008 | Overcash et al. | |
| 2008/0056487 A1 | 3/2008 | Akyol et al. | |
| 2008/0089338 A1 | 4/2008 | Campbell et al. | |
| 2008/0140795 A1 | 6/2008 | He et al. | |
| 2008/0184225 A1 | 7/2008 | Fitzgerald et al. | |
| 2008/0263658 A1 | 10/2008 | Michael et al. | |
| 2008/0271025 A1 | 10/2008 | Gross et al. | |
| 2008/0288962 A1 | 11/2008 | Greifeneder et al. | |
| 2008/0320499 A1 | 12/2008 | Suit et al. | |
| 2008/0320561 A1 | 12/2008 | Suit et al. | |
| 2008/0320583 A1 | 12/2008 | Sharma et al. | |
| 2008/0320592 A1 | 12/2008 | Suit et al. | |
| 2009/0049453 A1 | 2/2009 | Baran et al. | |
| 2009/0182928 A1 | 7/2009 | Becker et al. | |
| 2009/0183173 A1 | 7/2009 | Becker et al. | |
| 2009/0210427 A1 | 8/2009 | Eidler et al. | |
| 2009/0216816 A1 | 8/2009 | Basler et al. | |
| 2009/0254993 A1 | 10/2009 | Leone | |
| 2010/0011200 A1 | 1/2010 | Rosenan | |
| 2010/0332432 A1 | 12/2010 | Hirsch | |

OTHER PUBLICATIONS

Red Hat Office Action for U.S. Appl. No. 11/767,173, mailed Dec. 14, 2010.
Red Hat Notice of Allowance for U.S. Appl. No. 11/767,173, mailed Nov. 7, 2011.
Red Hat Office Action for U.S. Appl. No. 11/867,456, mailed Aug. 1, 2011.
Red Hat Office Action for U.S. Appl. No. 11/867,456, mailed Feb. 16, 2011.
Red Hat Office Action for U.S. Appl. No. 11/867,456, mailed Jan. 19, 2012.
Red Hat Office Action for U.S. Appl. No. 12/111,110, mailed Mar. 17, 2011.
Red Hat Office Action for U.S. Appl. No. 12/111,110, mailed Aug. 17, 2011.
Red Hat Office Action for U.S. Appl. No. 12/111,110, mailed Jan. 18, 2012.
Red Hat Office Action for U.S. Appl. No. 11/867,500, mailed Dec. 23, 2010.
Red Hat Notice of Allowance for for U.S. Appl. No. 11/867,500, mailed Jun. 29, 2011.
Red Hat Notice of Allowance for for U.S. Appl. No. 11/867,500, mailed Oct. 14, 2011.
Red Hat Office Action for U.S. Appl. No. 12/013,304, mailed Apr. 13, 2011.
Red Hat Office Action for U.S. Appl. No. 12/013,304, mailed Oct. 4, 2011.
Red Hat Office Action for U.S. Appl. No. 12/013,314, mailed Jul. 19, 2011.
Red Hat Office Action for U.S. Appl. No. 12/013,314, mailed Mar. 7, 2012.
Hardwood, Aaron, Parallel Virtual Machine, Oct. 22, 2003, pp. 1-5.
Red Hat Notice of Allowance for U.S. Appl. No. 11/867,456, mailed Jul. 16, 2012.
Red Hat Office Action for U.S. Appl. No. 12/111,110, mailed Jun. 11, 2012.

* cited by examiner

NETWORK TRAFFIC ANALYSIS USING A DYNAMICALLY UPDATING ONTOLOGICAL NETWORK DESCRIPTION

RELATED APPLICATIONS

The present patent application is a continuation-in-part of and claims priority to U.S. patent application Ser. No. 11/767,173, filed on Jun. 22, 2007, the disclosure of which is hereby incorporated by reference into the present patent application in its entirety. The present patent application is also related to U.S. patent application Ser. Nos. 12/111,110, 12/013,314; 12/013,304, 11/867,500, and 11/867,456, disclosures of which are hereby incorporated by reference into the present patent application in their entireties.

TECHNICAL FIELD

This invention relates generally to network traffic analysis and, in particular, to methods and apparatus for automatic and dynamic updating of an ontological description of a communications network.

BACKGROUND

Many communications networks, such as virtual private networks or other types of enterprise Information Technology (IT) infrastructure environments, for example, are administered by IT professionals (system administrators) who are responsible for secure and efficient functioning of the IT infrastructure. Conventional network management tools fail to provide a system administrator with a real-time understanding of how components making up the network are behaving and interacting operationally. For example, conventional tools permit network traffic analysis based only on static topologies and architecture diagrams that are based on how a network was designed and constructed. Thus, they fail to permit adequate analysis of dynamically changing communicative relations over the network.

Modern networks may be exceedingly complex and dynamic systems, consisting of a variety of entities. For example, entities in an enterprise IT infrastructure environment may include physical and virtual computing machines, arranged at nodes in a communications network, linked by a data transmission medium. The transmission medium could be wired, wireless, or some combination thereof. Various datastores, virtual and physical disks, virtual and physical subnetworks, users, service groups and administrative systems and processes may also constitute parts of the infrastructure environment.

Conventional network management tools and systems can describe logical relationships between enterprise entities, such as, for example, "Enterprise Server A" is linked to "Data Store A". Such tools and systems, however, fail to consider actual observed behavior of an entity (where no prescribed behavior is configured directly) and are inadequate to represent that behavior such that it can be dynamically correlated with monitored state.

As a result, conventional systems fail to enable a system administrator to understand how the IT infrastructure environment is actually being used in terms of both direct and indirect dependencies. For example, known techniques fail to account for indirect degradation of IT infrastructure entities that have a direct result on other IT infrastructure entities where a "communicates with" relationship exists. For example, an enterprise server "A" may appear by all accounts and instrumentation to be working properly, and the direct infrastructure dependencies such as storage and network devices may also be performing properly. But where an indirect dependency exists between two entities (such as an Enterprise Server "B" that enterprise server "A" has an "application communicates with" relationship) and depends on a third enterprise entity (e.g., a data store that the two entities do not share), known techniques fall short. Such indirect dependencies, undetectable by conventional techniques may cause Enterprise Server "B" to incur degraded performance which would cascade to degraded performance of Enterprise Server "A".

Absent knowledge of an indirect degradation of IT infrastructure entities that have a direct result on other IT infrastructure entities where a "communicates with" relationship exists, a system administrator cannot quickly resolve such problems, or efficiently identify and isolate a specific entity or group of entities that may be the catalyst of a network performance issue.

Furthermore, existing techniques fail to take into account how entities are communicating and what impact is/will likely take place as a result in a change in the operational usage. The lack of this knowledge makes it difficult to do effective impact analysis.

A need therefore exists for improved network traffic analysis techniques.

SUMMARY OF INVENTION

The present inventors have recognized that an enterprise IT infrastructure environment, including networks of computer entities consisting of physical and/or virtual machines located at network nodes, may be advantageously described via an ontology that describes the operational usage and current state of the entities rather than on a fixed IT infrastructure architecture. The proposed ontological description may be automatically and dynamically updated based on data acquired from data collection agents deployed to the nodes. The data collection agents may observe communicative relationships based on connections between nodes in operational use, while annotating a class state. Thereby, a network analyst or system operator may be provided with an improved ability to analyze network traffic.

Advantageously, data relating to actual connections may be acquired automatically in near real time. For example, an actual connection may be monitored in an interrupt-driven way while collecting information regarding an application that made the connection. Moreover a "volume for the connections" may be derived.

A software based data collection agent may be received by a computing device at a node within a communications network. The agent may be distributed to one or more nodes from a central node via the network. Once the software based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be such that it is transparent to, or undetected by a user of the node. The installed data collection agent may monitor data packet traffic between an adaptive driver layer and a protocol layer and report results of the monitoring to the central node.

In an embodiment network traffic analysis is performed by deploying, across a network having a plurality of network nodes, at least one data collection agent, on at least two of the plurality of network nodes; monitoring, with each data collection agent at each network node, a plurality of network connections instantiated during a monitoring time period; acquiring data from each data collection agent, said data resulting from said monitoring; automatically creating an ontological description of the network from said acquired data; dynamically updating said ontological description based on subsequently acquired data; and analyzing network traffic from said dynamically updating ontological description.

In further embodiment, deploying may include insertion of the data collection agent to access internals of an operating system of the network node.

In another embodiment, deploying may include insertion of the data collection agent in a network stack of the operating system of the network node, said network stack including instructions for implementing a set of protocols used to provide communications over the communications network.

In a yet further embodiment, deploying may include insertion of the data collection agent so as to interface with multiple locations of a network stack of the operating system of the network node.

In another embodiment, the data collection agent may normalize information collected from the network node with respect to the operating system of the network node.

In an embodiment, monitoring may include identifying at least one of network resource utilization, network performance, and network connectivity problems associated with the plurality of network connections.

In another embodiment 1 monitoring may include determining, with the agent, an application source within the network node associated with each instantiated network connection.

In an embodiment, acquiring data may be event driven with respect to the network connection. Further, an event driven acquiring data step may be performed upon occurrence of instantiating a network connection by at least one network node.

In an embodiment, dynamically updating said ontological description may occur in near real time.

In an embodiment, the ontological description may describe an operational relationship between the network nodes and a current state of the network nodes, and analyzing network traffic comprises describing a communicative relationship between at least two network nodes in terms of the ontological description.

In an embodiment, analyzing network traffic may include using SIGINT based traffic analysis methods to describe a peer relationship between at least two network nodes. Further, the peer relationship may denote a dependency of a first network node on a second network node.

In a further embodiment, analyzing network traffic comprises identifying an application being used to communicate with a network node.

In an embodiment, a baseline ontological description may be selectable, by a user, from said dynamically updating ontological description. Moreover, from the baseline ontological description may be indicated.

In an embodiment, the data collection agent may include a profile of anticipated application network connections for the network node, and the data collection agent may determine a state of the network node by comparing actual network connections to the profile.

In another embodiment, analyzing network traffic may include creating a visualization by processing, in a rendering engine, at least a subset of the ontological description, said visualization describing selected entities within the network and relationships therebetween; further, the visualization may be used to perform simulation modeling.

Embodiments may be implemented with an apparatus to perform the operations described herein. This apparatus may be specially constructed for the required purposes, or may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), flash drives, random access memories (RAMs), EPROMs, EEPROMs, magnetic or optical cards, or any other type of tangible media suitable for storing electronic instructions, and each coupled to a computer system bus.

BRIEF DESCRIPTION OF THE DRAWINGS

Features of the invention are more fully disclosed in the following detailed description of the invention, reference being had to the accompanying drawings, in which.

Figure 1:
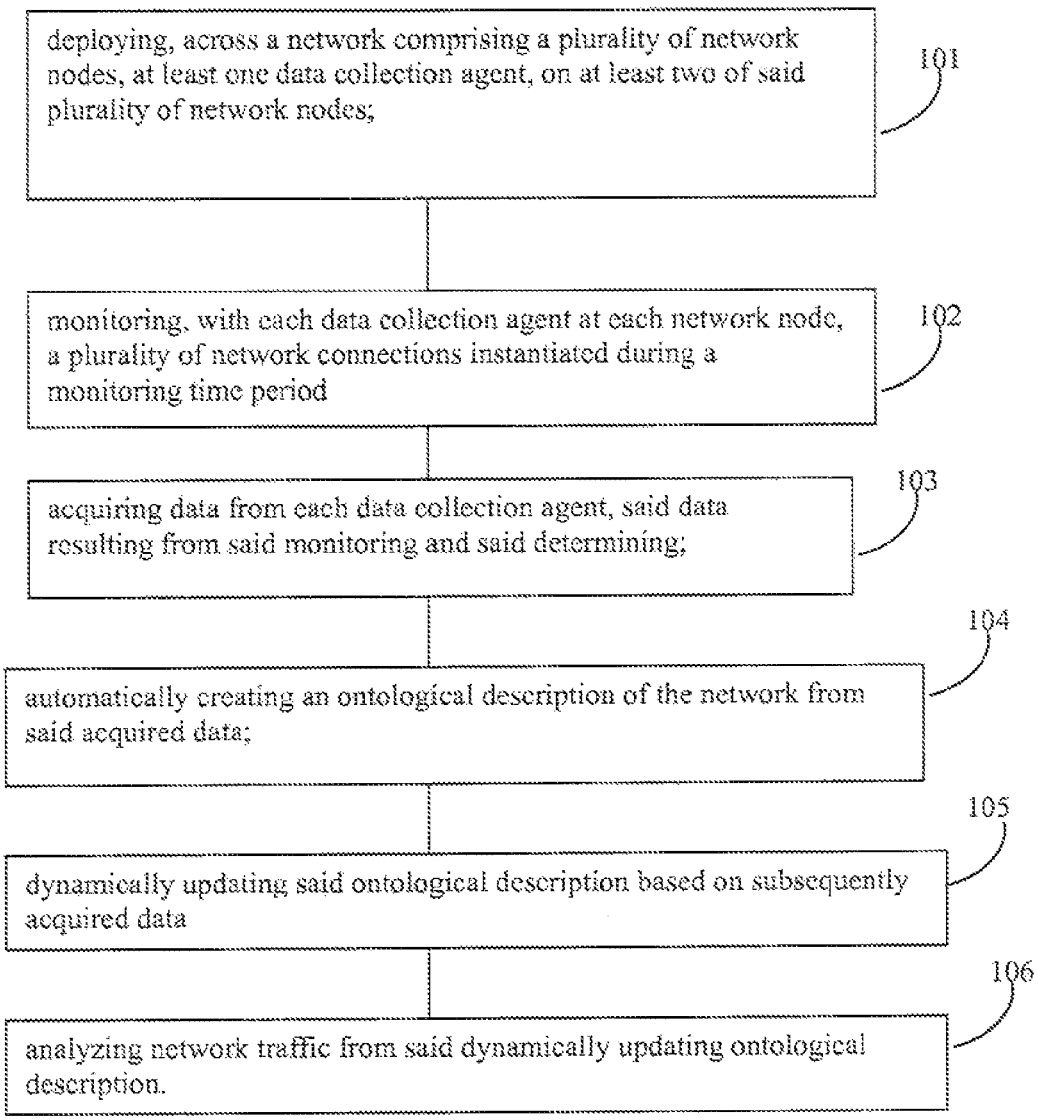
FIG. 1 describes an illustrative method embodiment.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

In view of the need for improved network traffic analysis capabilities, it is proposed to provide a data collection mechanism (or "agent") that may monitor network connections at a node. Advantageously, the agent may be transparent to the node in which it is inserted. Various embodiments of the data collection agent and an exemplary process for deploying one or more data collection agents are described hereinbelow.

As indicated, a number of agents may be remotely distributed from a single hardware platform to one or more computing nodes within an enterprise network infrastructure. The agents may be installed in stages and each stage may be selected taking into account characteristics of a node (e.g., a node's operating system type and version). An agent at any given mode may be configured to comprise an observation functionality, an analysis functionality, a reporting functionality, and/or some subset of those functionalities.

Referring now to FIG. 1, an illustrative method embodiment 100 will be described. Advantageously, a network for which traffic analysis is to be performed, may be described in terms of a knowledge base that consists of classes or entities of virtual and physical IT infrastructure, each such entity being referred to hereinafter as a "node" or a "network node". Even when such nodes exist as part of a virtual IT infrastructure, however, they are instantiated on physical IT assets. Ordinarily, although not necessarily, the network will consist of a large number of nodes, interconnected by way of a data transmission medium. At step 101, data collection agents may be deployed, across the network, to observe communication behavior of each node. The agents may be deployed on at least two nodes; advantageously, agents may be deployed on all or a substantial fraction of all the nodes within an enterprise network infrastructure. The agents may be deployed from and/or by a central node that may be a computer platform in communication with the network nodes via the data transmission medium. In some examples, this platform may be referred to as an administration console (AC).

"Deploying" an agent, as the term is used herein, means sending the agent to a node, and inserting the agent within the node so as to enable the agent to access internals of an operating system of the network node. In an embodiment, deploying involves inserting and storing the data collection agent in a network stack of the node's operating system, where the network stack (also known as a protocol stack) contains instructions that implement a set of protocols used to provide communications over the communications network. For example, the AC may propagate the agents out to the various network nodes via the data transmission medium. The AC may propagate the agents in stages so as to first cause a receiving network node to install a core aspect or core engine of the agent when a user of the node logs in. In an embodiment, insertion of the data collection agent is performed such that the agent interfaces with multiple locations of the network stack of the operating system of the network node. Advantageously, the installation may be designed to be transparent to the user and the core engine may be hooked into the stack of the operating system of the node.

Once deployed, the agents, step 102 may monitor, at each network node, a number of network connections instantiated during a monitoring time period. Monitoring may include, for example, observing electrical signals traveling across the network connections to determine an application source within the node associated with each instantiated network connection. Advantageously, communications of a node with one or more other nodes may be monitored within a kernel of a node's operating system and/or the user space (i.e., the area in virtual memory of a computer that contains user applications that execute at the application layer) so as to resolve the specific applications and processes that are instantiating the connection. The application layer, also known as Application Layer 7 when referencing the Open System Interconnect (OSI) protocol stack, represents the type of communications that occur as a result of a software program running on a physical computing device, often as a direct result of a human action. More specifically, the application layer symbolizes communications emanating from a particular application, such as an email communication, a file transfer, a client/server communication, or the like. As a way of contrasting, this layer does not have any knowledge or operate according to various communication protocols (e.g., packet-based or signal-based) that exist at lower layers.

In an embodiment, the data collection agent collects data about each network connection at the network node. The collected data may be used to identify one or more of network resource utilization, network performance, and network connectivity problems associated with the plurality of network connections. Furthermore, the data collection agent may aggregate data from a number of network connections at the network node. Such data may include, for example, the number of connections, the connection duration, the application making the connection, the systems involved in the connection, connection status, and connection resource usage information. This analysis and identification can involve techniques similar to those used in signals intelligence (or "SIGINT"), where the data can be used to determine what nodes are communicating with or signaling what other nodes, and the frequency and quantity of those communications.

Advantageously, the agent normalizes information collected from the node, with respect, for example, to the type of operating system associated with the node. For example, many operating systems use different nomenclature to represent physical devices addresses and network addresses which identify communication end points. Advantageously, this data may be normalized such that the AC is enabled to accurately map relationships between disparate operating systems correctly.

Data resulting from the foregoing monitoring may be acquired from each agent, step 103. For example the data may be acquired by the AC for processing. Data may be "pushed" by the agent to the AC (i.e, the AC initiates the transmission of the data), or "pulled" by the AC from the agent V. Once acquired by the AC, the data may be stored in physical memory accessible by the AC. Advantageously, data is acquired on an "event-driven" basis such that, for example, data related to instantiation of actual connections (as opposed to connection attempts) is acquired promptly upon occurrence of the instantiation event, rather than on a predetermined, periodic basis. As a result, in accordance with an illustrative embodiment, data relating to a network connection is acquired, and the network connection tracked, in real, or near-real, time.

From the acquired data, an ontological description of the network may be automatically created, step 104. For example, the AC may process acquired data about any particular node's communications activities using an algorithm to determine whether an associated communication relationship meets a preselected threshold of behavior and frequency to be considered a "communicates with" (or "peer to peer") relationship. Such a relationship may be found to exist when, for example, a repetitive pattern of network node (A) instantiating a network level communication with network node (B), and then an application within network node (B) instantiating a network level communication with network node (A) is detected. If, for example, four application instantiations of network communication occur within one hour the AC may classify the two nodes as having a "communicates_with" relationship. In such case, that relationship may be entered into a knowledgebase from which the ontological description may be derived. Additional information may also be received from the enterprise network infrastructure, such as dependency information, and resource utilization data and entered into the knowledgebase.

Alternatively, or in addition, an entity (whether virtual or physical) associated with any node may have a "state" established by, for example, detection of a physical condition of the node at discrete moment in time. The state may be established, for example, on the basis of assigning a threshold, followed by monitoring for any changes to such parameters as CPU usage, memory or storage capacity utilized, network uptime, configuration drift, and/or alerts or alarms from the network. In an embodiment, the data collection agent may include a profile of anticipated application network connections for the network node, and the data collection agent may determine a state of the network node by comparing actual network connections to the profile. The state may be annotated in a visual representation of the ontological description. Moreover, a weighting factor may be applied to the state to facilitate subsequent analysis by the system for alarming and alerting.

The ontological description may depict all or a selected portion of the knowledge base. Advantageously, the knowledge base may consist of a relational database that stores in physical memory all persistent data pertaining network communications traffic. This data may include, but is not limited to, system configuration information, system state information, as well as activity data acquired from the data collection agents. The database may additionally store module activity event configuration, network topology data, node inventory data, operator credentials, and operator activity log data.

Advantageously, the resulting ontological description need not be static. On the contrary, at step 105 the ontological description may be dynamically updated based on subsequently acquired data. The subsequently acquired data may be acquired from one or more agents, or from any other source. For example, a system administrator may update the description, manually or with computer assistance, based on data received from a network user, a vendor, a customer, or a third party. Moreover the system administrator may be enabled to select a baseline ontological description from the dynamically updating ontological description. Following such selection, deviations from the baseline ontological description may be indicated. Advantageously, dynamically updating the ontological description may occur in real time or near-real time. In an embodiment, for example, the inventors have found that the ontological description of the network may be dynamically updated within 50 seconds of a transmission of a message from a data collector for a network having one thousand nodes, of which 10% have experienced a change of state configuration, or relationship.

Figure 5:
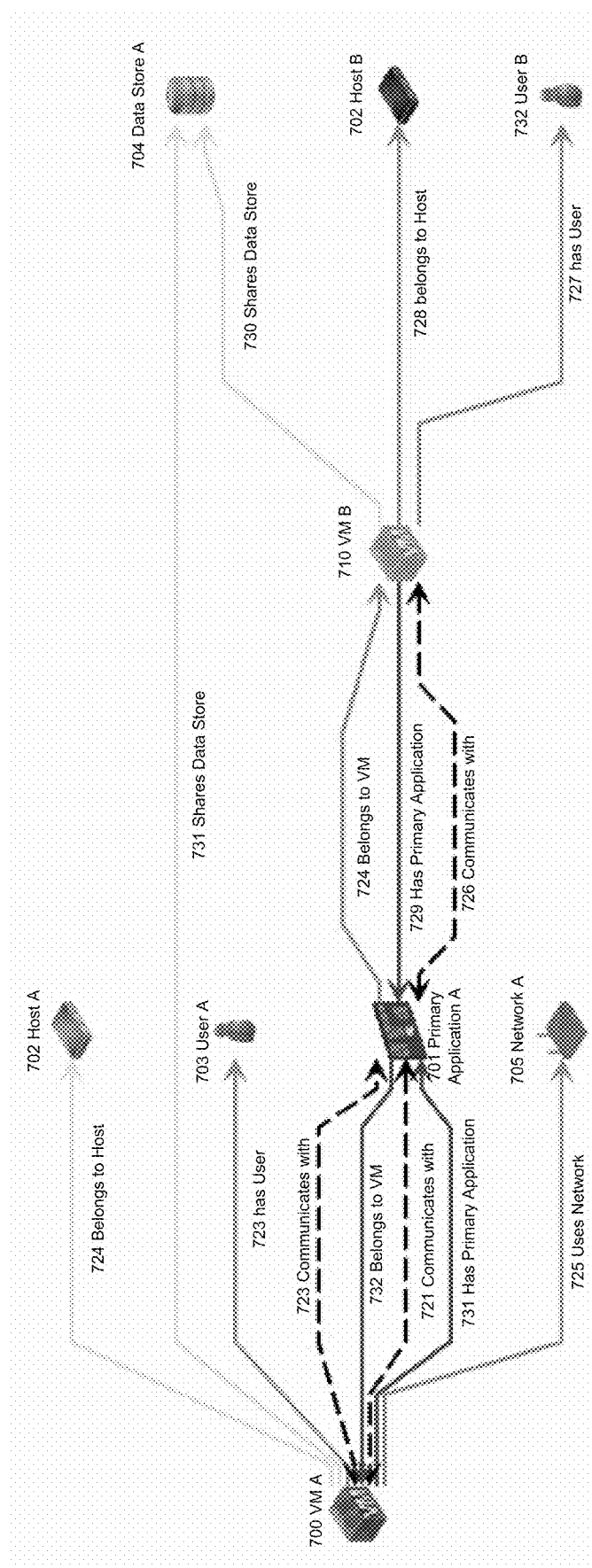
FIG. 5 depicts an illustrative example of a user interface of an embodiment.

Network traffic analysis from the dynamically updating ontological description may then be performed, step 106. The system administrator, for example, may navigate a visual representation (e.g., a directed graphs visualization) of the ontological description to select what relationships or specific entities to analyze. The visual representation, an illustrative example of which is depicted in FIG. 5, may, for example, describe selected entities within the network as well as applications within the entities. In an embodiment, network traffic analysis may include correlative analysis that may be performed in real time. In a further embodiment, network traffic analysis may include identification of one or more applications used to communicate with a network node.

Figure 2:
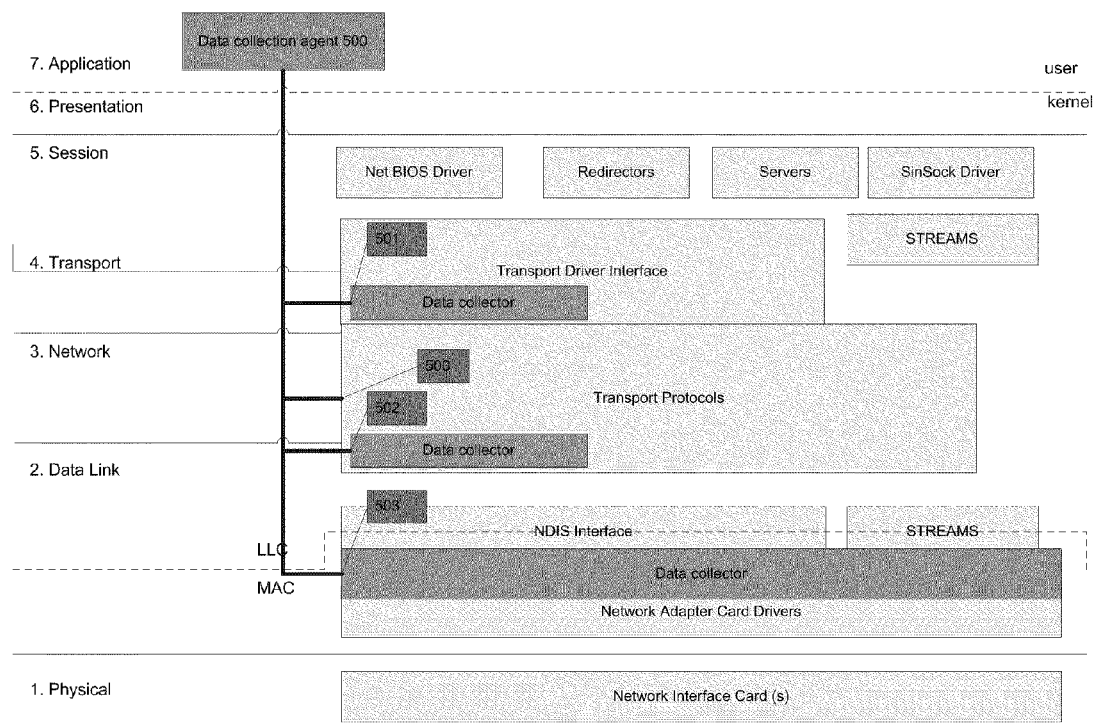
FIG. 2 illustrates insertion of a data collection agent, according to an embodiment.

Thus, a method for network traffic analysis has been disclosed. The foregoing method may be accomplished using appropriate apparati and systems. For example, referring now to FIG. 2, deployment of a data collection agent onto an operating system of a network node will be described in the context of the seven layer OSI model.

A data collection agent may support multiple processes depending on the target operating system and the exact data to be collected. For example, in some embodiments a data collection agent may only require a single hook into the operating system to collect a reasonable set of data. A hook is a point in the operating system where an application can install a subroutine to monitor message traffic over a connection via, for example, a system message-handling mechanism. Advantageously, for most operating systems, multiple hooks may be provided to collect the data required for the ontological description. Advantageously, with reference to the OSI model, a data collection agent may be inserted at the application layer of a network node, and has interfaces at lower layers of the OSI model as well. Data collection agents may interface with a network node in various ways; a few illustrative examples are provided hereinafter.

As an illustrative example, a data collection agent may have an interface 500 to an operating system's network stack and periodically determine what applications are using the network stack. Thereby the data collection agent may track information regarding a network connection, the connection duration, and any applications and systems involved in the connection. Moreover, the data collection agent may normalize the foregoing information and report it to the AC so that different operating systems may be correlated by the AC.

As a further example, the data collection agent may include a network filter inserted into the network stack to determine exactly when a connection is made between entities. The filter component of the data collection agent may be inserted at one or more layers of the OSI model. For example a data collection agent may have filter interface 501 at the transport layer and/or a filter interface 502 at the network layer. Thereby, the data collection agent may track information regarding a network connection, the connection duration, and any applications and systems involved in the connection. Moreover, the data collection agent may normalize the foregoing information and report it to the AC so that different operating systems may be correlated by the AC.

As a yet further example, the data collection agent described in the preceding paragraph may also include a packet filter inserted into the network stack to track connection data. For example, a data collection agent may have filter interface 503 at the data link layer. Then, data collection agent 500 may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the AC so that different operating systems may be correlated by the AC.

Figure 3:
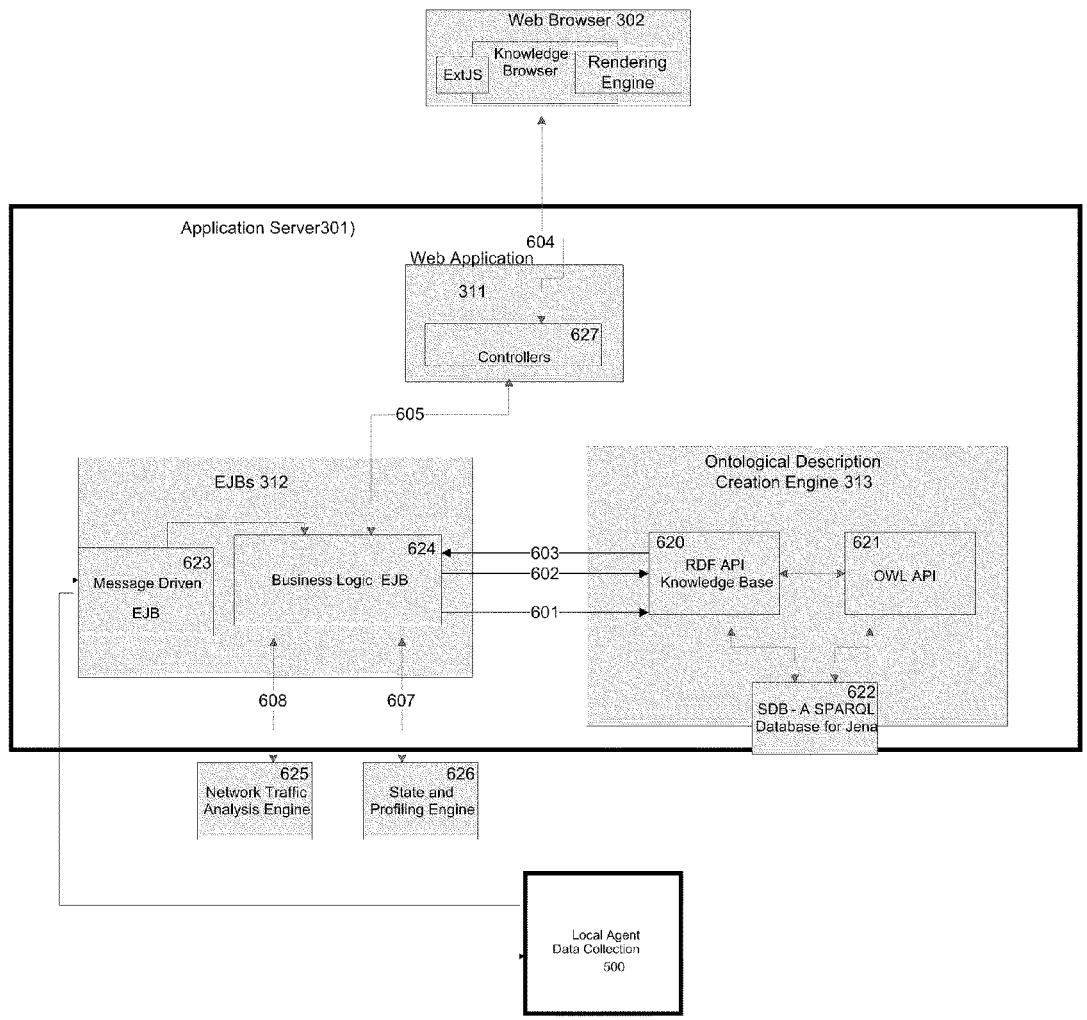
FIG. 3 depicts an illustrative system embodiment embodiment.

Referring now to FIG. 3, an illustrative system 300 for deploying data collection agents onto network nodes, monitoring network connections instantiated at each network node, acquiring resulting data, automatically creating an ontological description of the network from the acquired data; and dynamically updating the ontological description will be described. In an embodiment, elements of system 300 utilize the Java software platform and Enterprise Java Bean (EJB) architecture to provide certain functionality, and these well-known terms may be used in the description that follows.

Other software platforms and architectures, providing similar functionality may be used without departing from the scope of the present invention.

System 300 may consist of an application server 301, which interacts with across a network with a number of data collection agents 500. Advantageously, application server 301, may be an element of an administrative console (AC) that also provides a suite of network management tools. A system administrator may perform network traffic analysis and/or other network management tasks by accessing application server 301 by way of web browser 302. Application server 301 may consist of an EJB module 312, an ontological description creation engine 313, and a web application 311.

Data collection agents 500, as described hereinabove, may be deployed onto network nodes including physical and/or virtual machines in an enterprise IT infrastructure environment. After such deployment, application server 301 receives messages from data collection agents 500. These messages may consist of data representing, for example, state and relationship information about the network nodes, configuration information related to the IT infrastructure, performance/utilization data and network communication.

The received messages may be initially handled by EJB module 312. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 313. Initially, the data may be handled by Resource Description Framework (RDF) API knowledge base 620 where the data is categorized and stored utilizing a predefined entity relationship, determined by Ontology Web Language (OWL) API 621.

Messages handled by the Network Traffic Analysis Engine 625 may include source-to-destination data, qualified by a communicating application within the operating system of the originating node, as well as frequency of communication information. This data is analyzed by processing the number and type of connections to determine if an Ontological "communicates_with" relationship exists. A determination may be made by tracking the number of connections of a specific application over a period of time. The period of time may be preselected, for example, by the system administrator.

A data output from network traffic analysis engine 625 may be sent via signal flow paths 608 and 602 to ontological description creation engine 313. Initially, the data may be handled by RDF API Knowledge base 620 where the data is categorized and stored utilizing a predefined entity relationship, determined by OWL API 621. For example OWL API 621 may define what entity classes exist, their possible relationship to each other, and their possible state.

Figure 4:
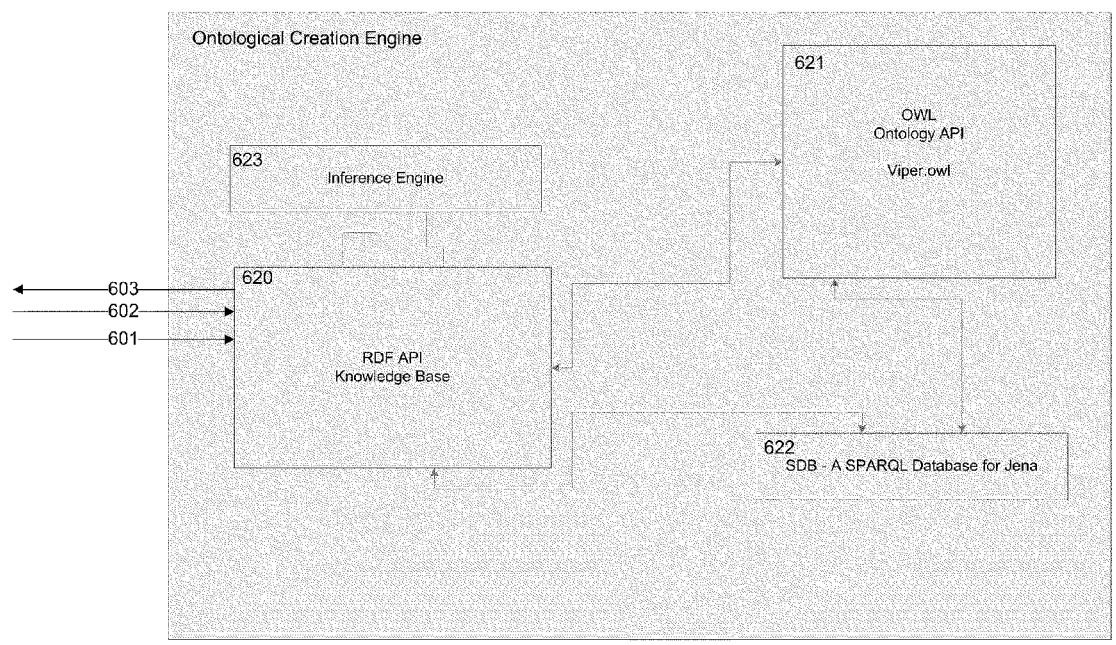
FIG. 4 illustrates a detail of ontological creation engine, according to an embodiment.

Referring now to FIG. 4, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL database and query language SPARQL Database for Jena 622 for later inference processing by inference engine 623. Inference engine 623 may determine inferred relationships based on the ontology model contained in OWL Ontology API 621.

In an embodiment, a visualization of network state and communication activity may be provided, whereby the system administrator is provided with a visual rendering (e.g., on a computer monitor) of the knowledge base as illustrated in FIG. 5. The visualization may be filtered to any selected entity of interest. For example, referring again to FIG. 3, the system administrator or other user may use a web browser 302 to request rendering of data via web application 311 from controllers 627. Controllers 627 may pass along any filtering information such as a specific Host Id. Next, business logic EJB 624 may be called by the controllers. Business logic EJB 624 may query RDF API knowledge base 620 for requested data. The requested data may be returned through controllers 627 to the web browser. The requested data may then be converted into a directed graph by a rendering engine.

In FIG. 5, for example, a rendering of Virtual Machine (VM) A 700, according to at least some of the embodiments of the present invention, illustrates that Virtual Machine (VM) A 700 has infrastructure dependencies of Network A 705, Data Store A 704, User A 703, Host A 702, and a Primary Application A 701. VM A 700 has a "communicates_with" relationship with VM B 710. VM A 700 may be presented as being in a "red" state as a result of having an associated alert set or having a specified parameter exceed a defined threshold. In addition, Data Store A 704 and Host A 702, which are used by VM A 700 may be presented as being in a "yellow state". The system administrator, thereby, is enabled to analyze the potential impact and cause of the resulting state of VM A 700.

The visualization shows that the "communicates_with" relationship between VM A 700 and VM B 710 is constrained by Primary Application A 701. The visualization also makes clear that VM A 700 and VM B 710 share data store A 704.

The system administrator may inspect any entity in the visualization. Then an impact summary may be generated, consisting, for example, of current and historic information derived from processed messages received from the data collection agents. This information may be correlated to provide the system administrator with an overall impact assessment of the dependent entities in the infrastructure that may be automatically and dynamically updated in near real time.

In an embodiment, the system administrator or other user is enabled to perform simulation modeling, in addition to the foregoing network traffic analysis of "real" data. For example, what/if analysis may be performed, by substituting simulated data for some (or all) real acquired data. By utilizing all or part of the ontology representation contained in A SPARQL Database 622, inference engine 623 may be employed to determine the dependencies of a given entity and to simulate the impact of a migration of that entity to another location or infrastructure. For example, an operator may select any number of infrastructure entities and expand their relationship dependencies to simulate what adjacent entities will need to be considered upon making a decision to move, re-configure, or re-allocate resources to those entities.

Thus, using the teachings of the present disclosure, substantial improvements to network traffic analysis are achieved.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for network traffic analysis, said method comprising:
    deploying, across a network comprising a plurality of network nodes, at least one data collection agent, on at least two of said plurality of network nodes;
    monitoring, with each data collection agent at a respective network node, a plurality of network connections instantiated during a monitoring time period for said respective network node, wherein each data collection agent is inserted at the respective network node to interface with multiple locations of a network stack of an operating system of the respective network node to track each of the plurality of network connections associated with the respective network node;
    acquiring data from each data collection agent, said data resulting from said monitoring;
    creating an ontological description of the network using the acquired data, the ontological description of the network comprising the plurality of network nodes and current connections of the plurality of network nodes;
    updating said ontological description based on data subsequently acquired by each data collection agent at each network node; and analyzing network traffic using the updated ontological description.

2. The method of claim 1, wherein the data collection agent is inserted to access internals of the operating system of the network node.

3. The method of claim 2, wherein the data collection agent is inserted in the network stack of the operating system of the network node, said network stack comprising instructions for implementing a set of protocols used to provide communications over the communications network.

4. The method of claim 2, wherein the data collection agent normalizes information collected from the network node with respect to the operating system of the network node.

5. The method of claim 2, wherein said monitoring comprises identifying at least one of network resource utilization, network performance, and network connectivity problems associated with the plurality of network connections.

6. The method of claim 1, wherein said monitoring comprises determining, with said agent, an application source within the network node associated with each instantiated network connection.

7. The method of claim 1, wherein said acquiring data operation is event driven with respect to the network connection.

8. The method of claim 7, wherein an event driven acquiring data operation is performed upon occurrence of instantiating a network connection by at least one network node.

9. The method of claim 1, wherein dynamically updating said ontological description occurs in near real time.

10. The method of claim 1, wherein the ontological description describes an operational relationship between the network nodes and a current state of the network nodes, and analyzing network traffic comprises describing a communicative relationship between at least two network nodes in terms of the ontological description.

11. The method of claim 1, wherein analyzing network traffic comprises using SIGINT based traffic analysis methods to describe a peer relationship between at least two network nodes.

12. The method of claim 11, wherein, the peer relationship denotes a dependency of a first network node on a second network node.

13. The method of claim 1, wherein analyzing network traffic comprises identifying an application being used to communicate with a network node.

14. The method of claim 1, wherein a baseline ontological description is selectable, by a user, from said dynamically updating ontological description.

15. The method of claim 14, wherein deviations from the baseline ontological descriptions are indicated.

16. The method of claim 1, wherein the data collection agent comprises a profile of anticipated application network connections for the network node, and the data collection agent determines a state of the network node by comparing actual network connections to the profile.

17. The method of claim 1, wherein said analyzing network traffic comprises creating a visualization by processing, in a rendering engine, at least a subset of the ontological description, said visualization describing selected entities within the network and relationships there between.

18. The method of claim 17, further comprising using the visualization to perform simulation modeling.

19. A system for network traffic analysis, said system comprising:
    a memory;
    a processor, coupled to the memory; and
    an application server, executed from the memory by the processor, wherein the application server is to:
    deploy, across a network comprising a plurality of network nodes, at least one data collection agent, on at least two of said plurality of network nodes, each said data collection agent monitoring, at a respective network node, a plurality of network connections instantiated during a monitoring time period, wherein each data collection agent is inserted at the respective network node to interface with multiple locations of a network stack of an operating system of the respective network node to track each of the plurality of network connections associated with the respective network node;
    acquire data from each data collection agent, said data resulting from said monitoring;
    create an ontological description of the network using the acquired data, the ontological description of the network comprising the plurality of network nodes and current connections of the plurality of network nodes;
    update said ontological description based on data subsequently acquired by each data collection agent at each network node; and
    create a visualization of said ontological description for analyzing network traffic using the updated ontological description.

20. A non-transitory computer readable medium having instructions that, when executed by a processing device, cause the processing device to perform a method for network traffic analysis, said method comprising:
    deploying, across a network comprising a plurality of network nodes, at least one data collection agent, on at least two of said plurality of network nodes;

monitoring, with each data collection agent at a respective network node, a plurality of network connections instantiated during a monitoring time period for said respective network node, wherein each data collection agent is inserted at the respective network node to interface with multiple locations of a network stack of an operating system of the respective network node to track each of the plurality of network connections associated with the respective network node;

acquiring data from each data collection agent, said data resulting from said monitoring;

creating an ontological description of the network using the acquired data, the ontological description of the network comprising the plurality of network nodes and current connections of the plurality of network nodes;

updating said ontological description based on data subsequently acquired by each data collection agent at each network node; and analyzing network traffic using the updated ontological description.

* * * * *